3,694,229
PROCESS FOR PREPARING DRY LAYER CAKE MIX AND THE RESULTING PRODUCT
Norrain E. Norsby, Hopkins, and Robert F. Kozlik and John R. Roach, Minneapolis, Minn., assignors to General Mills, Inc.
No Drawing. Filed Aug. 21, 1970, Ser. No. 66,133
Int. Cl. A21d 2/00
U.S. Cl. 99—94          5 Claims

ABSTRACT OF THE DISCLOSURE

A dry layer cake mix that is shelf stable, rehydrates quickly and is hand mixable. The process for making the mix includes making a moistened mixture of the ingredients, adding previously dried ingredients thereto and air drying the mixture.

---

This invention relates to dry cake mixes capable of rapid rehydration and hand mixing and the process for making same. More particularly, it relates to dry layer cake mixes capable of rapid rehydration and hand mixing having improved storage stability and a simplified method of manufacture.

Conventional dry layer cake mixes contain at least flour, shortening and sugar. In order to attain a free flowing and bacteriologically stable composition in the conventional mix, the flour is specially dried from its original moisture content of about 12 to 14% by weight to a moisture content of about 8 to 10% by weight before being incorporated into the mix. Usually the flour is about 35% to 45% by weight of the mix, the shortening about 1% to 16% and preferably about 8% to 16% by weight of the mix and the sucrose about 85% to 125% by weight based on the weight of flour. The flour customarily used is soft wheat flour. The shortening may be of animal or vegetable origin and includes plasticized lard, hydrogenated vegetable oils and rearranged lards. In order to meet commercial quality standards, some type of emulsifier is generally included in the mix. Typical emulsifiers are monoglycerides of fatty acids, propylene glycol monoesters of fatty acids, glycerol lactopalmitate, sodium stearyl fumarate, sodium stearyl lactylate and mixtures thereof. The amount of emulsifier used is determined by the particular emulsifier employed. The emulsifier can be incorporated into the shortening or added separately. Other selected ingredients such as leavening agents, flavorings, stabilizers and dried eggs may be included depending upon the particular cake to be produced. Any of a wide variety of chemical leavening systems or compositions are available and can be used. Normally, the chemical leavening consists of a combination of sodium bicarbonate and an acidifier. Representative acidifiers to be used include glucona-delta lactone, potassium bitartrate, tartaric acid, disodium phosphate, sodium aluminum sulfate, sodium aluminum phosphate, sodium acid pyrophosphate, anhydrous monocalcium phosphate, monocalcium phosphate monohydrate, citric acid, fumaric acid, adipic acid and the like. Mixtures of the various acidifiers can be used. Also, other carbonates and bicarbonates such at $Na_2CO_3$, $KHCO_3$ and $NH_4CO_3$ may be used. Commercially available baking powders are entirely suitable but are not normally used by the mix manufacturer. The chemical leavening is generally used at a level of less than about 10% by weight based on the weight of the starting composition and preferably in the range of about 0.5 to 5.0% by weight. Some mixes include dry eggs while others are designed so that this ingredient is added fresh at the time the cake is to be baked. Preparing a cake from a dry cake mix is a well-known procedure of rehydrating the mix and baking the resulting batter at moderate oven temperatures.

The conventional dry layer cake mix is made by blending the ingredients in a dry state to form a reasonably homogeneous mixture. A number of variations in methods of dry blending are currently used. In some instances, a premix of two or more ingredients is made and added to a mixture of the other ingredients. In some procedures, the shortening is kept in a liquid form until the blending is completed and, in other instances, the temperature is held low enough so that the shortening is easily broken into small pieces and these small pieces are distributed throughout the mixture.

Conventional cake mixes require (after adding a liquid) two to five minutes of beating using a mechanical mixer operating at about 500 r.p.m. to produce a cake batter which will subsequently bake to produce a cake of good quality. One of the objects of this invention is to reduce the amount of beating or mixing necessary to form a batter. The optimum result in this respect is a dry cake mix which forms a cake batter with liquid in a matter of seconds by hand whipping or blending.

In addition to requiring substantial beating or whipping to form batters, conventional cake mixes do not necessarily produce uniform results. Due to the very nature of the dry blending technique, the finely divided dry ingredients are unevenly distributed throughout the mass of material and do not form a truly homogeneous mixture. When the mass is divided into small batches from which cakes are to be made, the small batches are frequently not the same. Hence, another object of this invention is to improve the uniformity of distribution of ingredients in the production mass and thereby obtain more uniform results from the small batches used by the consumer.

Conventional dry layer cake mixes also have a tendency to form areas in which the mix is compacted into dense masses. The compacted portions of the dry mix absorb liquid less rapidly than the noncompacted portions, and sometimes not at all, thus forming lumps in the batter and defects in the final cake. Compacting occurs when pressure is applied and the shortening coated ingredient particles stick together. Compacted or hard areas also form when there is moisture accumulation or migration within the mix. Accumulation can occur when high humidity air penetrates a package. Moisture migration occurs when packages are subjected to high temperatures during storage and part of the moisture in the mix vaporizes and migrates to the more hydrophilic ingredient particles. Therefore, still another object of this invention is to stabilize the mixes to prevent compacting when the mix is subjected to pressure or conditions which would induce moisture migration or accumulation in the conventional mix.

At the present time there is known to the art a few methods of treating layer cake batters to produce hand mixable, rapidly rehydratable dry layer cake mixes. Some of these methods involve spray drying, freeze drying or vacuum drying cake batters in some form. In one such procedure, the dry ingredients, with the exception of the leavening agent, are moistened to form a viscoelastic mass having a moisture content of at least 25%. This moistened mass is then freeze dried or vacuum dried. Alternatively, the mass can be spray dried if the moisture content is at least 45%.

One disadvantage of the above procedures is that freeze drying, vacuum drying and spray drying are expensive manufacturing steps. Another disadvantage is that these procedures do not entirely stabilize the mix. Moisture migration or accumulation occurs during storage at high temperatures or exposure to high relative humidities and lumps are formed. This lack of storage stability may be related to the configuration of the sugar crystals in the mixes. Freeze drying, vacuum drying and spray drying, as known in the art, produce agglomerates having sintered, fragile crystal sugar nuclei. In addition to these sintered, fragile crystal sugar nuclei, a very large portion of sucrose, in the order of 70% or more by weight in these mixes, is in the form of very fine crystals about 12 microns in diameter. During storage at high temperatures, these fine sugar crystals dissolve in the water freed from the mix by the high temperature and cause binding and agglomerating in the mix which results in lumping in the final product. These fine sugar crystals also cause binding and agglomerating in the mix when packages are penetrated by air having high relative humidities.

We have now invented a dry layer cake mix which is hand mixable and rapidly rehydratable, is storage stable and lends itself to a simple and inexpensive form of manufacture. The dry layer cake mixes of the present invention can be readily made into batters with only hand mixing. When a mechanical mixer is used, only a minimum amount of mixing is required. For example, using a mechanical mixer operating at 500 r.p.m., the mixes of this invention require only 30 seconds mixing time. Longer periods of vigorous mixing, however, are not deleterious to the final product. In addition, the dry mixes are so manufactured as to assure uniformity in the final product. Furthermore, the dry layer cake mixes of this invention are substantially more stable and resistant to compacting when subjected to high temperatures or high relative humidities than other known hand mixable dry layer cake mixes.

The physical structure of the dry layer cake mixes of this invention are distinct from the physical structures of presently available rapidly rehydratable mixes and probably accounts for their improved storage stability. About 50 to 70% by weight of the sucrose in the mix is in the form of large, discrete, sucrose crystals which are the nuclei of sucrose, flour and shortening complexes and are enrobed by the flour and shortening. The complexes have diameters of from about 400 to 800 microns. The sucrose crystal nuclei have diameters of from about 100 to 400 microns. About 30 to 50% by weight of the sucrose in the mix is in the form of relatively large, solid, discrete sugar crystals free from enrobement. These crystals generally have diameters of from about 100 to 400 microns. A small amount of sucrose, about 4 to 7% by weight of the sugar in the mix, is somewhat dissolved and recrystallized in fine particles. These fine particles dissolved and recrystallized in such a way as to bind a small discrete amount of other ingredients into small agglomerated complexes having a mean diameter of about 100 to 400 microns.

Thus, the sucrose in dry layer cake mix of this invention is present in three forms: (1) as large, enrobed, solid crystals, (2) as large, unenrobed, solid crystals, and (3) as small sucrose crystals partially dissolved and subsequently recrystallized or solidified and complexed in small agglomerates with other ingredients in the mix.

The dry layer cake mixes of the present invention contain as ingredients at least flour, shortening and sugar and preferably an emulsifying agent. The proportions can be the same as those used in the conventional dry layer cake mixes described above. The flour component, however, need not be previously dried as is necessary in making conventional mixes. Deviations from these conventional proportions can be made depending upon the end product desired. Other selected ingredients such as leavening agents, flavorings, stabilizers and dried eggs may be included depending upon the particular cake to be produced.

The dry layer cake mixes can be made according to this invention by mixing the dry ingredients, excluding at least one component of any leavening combination used, moistening the mixture to a moisture content of about 17 to 30% by weight of the mixture, combining the moistened mixture with a previously dried portion of the same composition having a moisture level below about 5% in proportions preferably from about 6:1 to 1:12.5 parts by weight of moistened mixture to previously dried material to adjust the total moisture content of the combined mixtures to about 5% to 15% by weight of the total combined mixture and subsequently air drying the entire mixture to a moisture content below about 5% by weight of the composition and preferably to between about 3 to 3.9%.

Mixing of the initial dry ingredients by conventional means is adequate to produce an acceptable dry mix, however, more intimate mixing produces a superior end product. This additional mixing and blending can be accomplished by passing the mix through a fluid energy mill which grinds or pulverizes the particles by particle-particle abrasion. A fluid energy mill is any apparatus in which food particles may be carried in a fluid stream and in which the particles are caused to collide with one another with sufficient force to result in particle-particle abrasion and a fine grind of the food particles. This type of milling also dries the mix to some extent.

Once the selected ingredients have been mixed and blended, water is added in an amount to increase the moisture content of the total mix to about 17% to 30% by weight. The moistened mixture is blended to distribute the added water uniformly. After blending, the moistened mixture is combined with enough previously dried mix, without an active leavening system being included, to reduce the moisture content of the composition to about 5% to 15% by weight of the total mixture. The mixes are thoroughly mixed to attain uniformity. Best results have been obtained by metering the moistened mixture into the previously dried mixture while the latter is being agitated. The blended mixture of the moistened ingredients and the previously dried material is dried to a moisture content below about 5% by weight in a conventional air drier using air temperatures of from about 70° F. to 135° F. Optimum results are obtained when drying is conducted at air temperatures between about 90° F. to 120° F.

The chemical leavening system, if any is used, should be inactive during the mixing and drying process. This can be accomplished by including only one or neither of the leavening components in the mix prior to removing the mix from the mixing and drying process. A chemical leavening component can be easily blended into the mix after processing and before it is used. If no leavening agent is incorporated into the mixture, the resulting mixture is a premix to which leavening can be added prior to baking. Although not essential, it is also preferable to incorporate conditioning agents such as pregelatinized starch, which absorbs free water more rapidly than some other mix ingredients, into the mix after it has been removed from the recycling and drying processes. Guar gum is frequently used as a viscosity stabilizer and can be added either before or after the mixing and drying process.

It is readily apparent that in a continuous manufacturing operation, part of the material from the air drier is recycled back into the system and blended with moistened mix coming through the system. Experience has shown that the final product improves as recycling progresses. To the non-recycled portion of the dry mix are added ingredients, such as a chemical leavening agent, conditioners such as pregelatinized starch and flavoring that are too heat labile to be subjected to the drying temperatures.

To better illustrate the process of the present invention, specific examples of the process are set out below in detail.

EXAMPLE I

A cake mix formulation which is presently commercially available in a conventional form was used as the formulation for the following hand whippable, rapidly rehydratable product.

The following cake mix ingredients were blended:

| Ingredients: | Percent by wt. of final mix composition |
|---|---|
| Regular grind sucrose | 41.95 |
| Soft wheat flour | 34.88 |
| Emulsifier propylene glycol monostearate (Durkee Foods Inc.) | 1.05 |
| Shortening, hydrogenated vegetable oil | 8.65 |
| Cocoa | 5.65 |
| Dextrose | 1.83 |
| Milk, nonfat dry | 1.00 |
| Salt | 0.78 |
| Vanilla | 0.28 |
| Guar gum | 0.25 |
| Color | 0.06 |
| Total | 96.38 |

This mixture was then initially moistened and dried as follows to obtain start-up feedback material.

(1) Five thousand grams of the mix was placed in a 20 quart Hobart bowl equipped with a wire strung paddle.

(2) With the mixer operating at low speed, 500 grams of water was slowly added to produce a moisture level of about 15% by weight.

(3) The resulting mix was dried in a circulating air oven at a temperature of 110° F. to a final moisture of 3–3.9%.

(4) The dried mix was then ground in a Fitzmill using a 2A screen, on high speed, with impact forward.

Once the initial start-up feedback material was obtained the process for preparing a hand whippable, rapidly rehydratable mix was carried out as follows:

(1) Another mixture of the ingredients listed above was blended.

(2) Two thousand five hundred grams of the blended ingredients was placed in a 20 quart Hobart bowl.

(3) Five hundred grams of water was added and the mixture was mixed on second speed for a period of 6 minutes to produce a mixture having a moisture content of 25% by weight of the mixture.

(4) Two thousand five hundred grams of the start-up feedback material was placed in another 20 quart Hobart bowl equipped with a wire strung paddle.

(5) The moistened mixture prepared in steps 1–3 was slowly added to the start-up, feedback material while stirring at low speed.

(6) The combined mixture of the start-up, feedback material and the moistened mixture was dried and ground using the same method as used in drying and grinding the start-up, feedback material.

The procedure was repeated through four recycles. In each cycle a portion of a fresh moistened mixture was added into a portion of the dried and ground mix from the previous cycle. To the material obtained from the fourth cycle the following ingredients were added:

| Ingredients: | Percentage by weight of final mix |
|---|---|
| Pregelatinized wheat starch | 1.85 |
| Sodium bicarbonate | 1.12 |
| Anhydrous monocalcium phosphate | 0.45 |
| Sodium stearyl fumarate | 0.20 |
| Total | 3.62 |

The resulting cake mix had the following storage and performance characteristics.

In storage at a temperature of 100° F. this sample, after twelve weeks, had not developed any lumps. A freeze dried sample of the same mix formulation but using no feedback developed numerous lumps after only four weeks. The same results were obtained when similar samples were stored at a relative humidity of 65% with temperatures cycled from 70° to 90° F.

The mix was made into a batter by adding 360 cc. water and two whole eggs to 540 grams of mix and beating by hand for 30 seconds. The batter was then poured into a 9 inch cake pan and baked at 350° F. for 28 minutes. The resulting cake had a moist, fresh mouthfeel and a volume of 1400 cc.

EXAMPLE II

This example illustrates the use of a fluid energy mill for the initial mixing of the dry ingredients.

A mixture of the following ingredients was passed through a fluid energy mill ("Jet-O-Mizer" manufactured by the Fluid Energy Process Equipment Co.) operated at an air pressure of 80 p.s.i. at a rate of 15 lbs. per minute.

| Ingredients: | Percentage by weight |
|---|---|
| Regular grind sucrose | 50.56 |
| Soft wheat flour | 47.85 |
| Emulsifier propylene glycol monostearate (Durkee Foods Inc.) | 1.59 |
| | 100.00 |

The mixture was placed in a Hobart Mixer equipped with a wire strung paddle along with the following ingredients in the proportions shown below.

| Ingredients: | Percentage by weight of final dry mix |
|---|---|
| Mixture from fluid energy mill | 72.78 |
| Shortening, hydrogenated vegetable oil | 8.65 |
| Dark dutch cocoa | 5.65 |
| Regular grind sucrose | 5.16 |
| Dextrose | 1.82 |
| Nonfat milk solids | 1.00 |
| Salt | 0.75 |
| Vanilla | 0.28 |
| Guar gum | 0.23 |
| Color | 0.06 |
| | 96.38 |

Water, in the amount of 10% of the weight of the above ingredients, was added slowly while mixing on medium speed. The resulting mixture had a moisture content of about 15% by weight of the composition. After the addition of the water was completed, the moistened mixture was mixed for three minutes at low speed and then for three minutes at high speed. Finally the mixture was dried overnight in a circulating air oven at a temperature of about 110° F. for a period of about 16 hours to a moisture content of about 3.9% by weight of the composition. After the initial sample was dried and ground it was used as the initial feedback. The procedure and amounts of water used in the recycling process were the same as in Example I. Four recycles were made feeding back a portion of the air dried material from each cycle and taking a portion of the material from each cycle out of the mixing and drying process. To the portions removed from each cycle the following ingredients were added.

| Ingredients: | Percentage by weight of dry mix |
|---|---|
| Pregelatized wheat starch | 1.85 |
| Sodium bicarbonate | 1.12 |
| Anhydrous monocalcium phosphate | 0.45 |
| Sodium stearyl fumarate | 0.20 |
| | 3.62 |

A sample of dried mix from each recycle was made into a batter by adding 360 cc. water and two whole eggs to 540 grams of mix and beating by hand for 30 seconds. The batters were then poured into 9 inch cake pans and baked at 350° F. for 28 minutes. The resulting cakes had a moist, fresh mouthfeel and the following volumes.

|  | Volume of test cake, cc. |
|---|---|
| First feedback | 1330 |
| Second feedback | 1330 |
| Third feedback | 1345 |
| Fourth feedback | 1360 |

The embodiments of the invention in which an exclusive property or privilege is claimed are defined as follows:

1. A dry layer cake mix formulation comprising flour, shortening and sucrose wherein the sucrose is in three forms, namely:
    about 50% to 70% by weight of the sucrose in the form of solid, single crystals having diameters of from about 100 to 400 microns and enrobed in flour and shortening to form complexes having diameters of from about 400 to 800 microns, each solid, single crystal being the nucleus of a complex,
    about 30% to 50% by weight of the sucrose in the form of solid, single crystals having diameters of from about 100 to 400 microns, and
    about 4% to 7% by weight of the sucrose in the form of small crystals complexed with and binding flour and shortening into agglomerates having a mean diameter of about 100 to 400 microns, said mix being prepared by the method of claim 2.

2. A process for manufacturing a dry layer cake mix composed principally of flour, shortening and sucrose, said sucrose being in three forms, namely:
    about 50% to 70% by weight of the sucrose in the form of solid, single crystals having diameters of from about 100 to 400 microns and enrobed in flour and shortening to form complexes having diameters of from about 400 to 800 microns, each solid, single crystal being the nucleus of a complex,
    about 30% to 50% by weight of the sucrose in the form of solid, single crystals having diameters of from about 100 to 400 microns and being free from enrobement, and
    about 4% to 7% by weight of the sucrose in the form of fine particles dissolved and recrystallized in such a way as to bind a small discrete amount of other ingredients into small agglomerated complexes having a mean diameter of about 100 to 400 microns which comprises the following steps:
        forming an unleavened, intimate, initial mixture of the dry ingredients of the dry layer cake mix;
        moistening said initial mixture with sufficient water to produce a mixture having a moisture content of from about 17% to 30% by weight;
        combining said moistened initial mixture with sufficient amounts of unleavened dry layer cake mix containing the same ingredients and having a moisture level of below about 5% to produce a moisture content of the resulting combined mixture of about 5% to 15% by weight of the combined mixture; and
        air drying said combined mixture to a moisture level below about 5% by weight of the mixture.

3. The process of claim 2 wherein a chemical leavening system is incorporated into the air dried combined mixture.

4. The process of claim 2 wherein the initial mixture has been intimately mixed in a fluid energy mill.

5. The process of claim 2 wherein the steps are repeated one or more times and a portion of the air dried combined mixture is recycled.

References Cited

UNITED STATES PATENTS

| 3,508,928 | 4/1970 | Ewing et al. | 99—94 |
| 3,508,929 | 4/1970 | Callaghan et al. | 99—94 |
| 3,116,150 | 12/1963 | Baker | 99—94 |
| 3,505,079 | 4/1970 | Meade et al. | 99—94 |
| 3,383,217 | 5/1968 | Meade et al. | 99—94 |

RAYMOND N. JONES, Primary Examiner